United States Patent [19]
Cowell et al.

[11] Patent Number: 5,452,574
[45] Date of Patent: Sep. 26, 1995

[54] GAS TURBINE ENGINE CATALYTIC AND PRIMARY COMBUSTOR ARRANGEMENT HAVING SELECTIVE AIR FLOW CONTROL

[75] Inventors: Luke H. Cowell, San Diego; Peter B. Roberts, Encinitas, both of Calif.

[73] Assignee: Solar Turbines Incorporated, San Diego, Calif.

[21] Appl. No.: 181,516

[22] Filed: Jan. 14, 1994

[51] Int. Cl.⁶ .............................. F02C 7/228; F23R 3/26; F23R 3/40
[52] U.S. Cl. .............................. 60/39.23; 60/723; 60/746
[58] Field of Search .............................. 60/723, 733, 737, 60/738, 746, 39.23

[56] References Cited

U.S. PATENT DOCUMENTS

| | | | |
|---|---|---|---|
| 3,938,326 | 2/1976 | Decorso et al. | 60/723 |
| 4,040,252 | 8/1977 | Mosier et al. | 60/737 |
| 4,285,193 | 8/1981 | Shaw et al. | 60/723 |
| 4,432,207 | 2/1984 | Davis, Jr. | 60/723 |
| 4,433,540 | 2/1984 | Cornelius | 60/39.511 |
| 4,534,165 | 8/1985 | Davis, Jr. et al. | 60/723 |
| 4,926,645 | 5/1990 | Iwai | 60/723 |
| 5,000,004 | 3/1991 | Yamanaka et al. | 60/723 |
| 5,161,366 | 11/1992 | Beebe | 60/723 |
| 5,218,824 | 6/1993 | Cederwall et al. | 60/737 |

FOREIGN PATENT DOCUMENTS

| | | | |
|---|---|---|---|
| 58-179730 | 10/1983 | Japan | 60/723 |
| 59-7722 | 1/1984 | Japan | 60/723 |
| 61-12633 | 6/1986 | Japan | 60/723 |

*Primary Examiner*—Timothy S. Thorpe
*Attorney, Agent, or Firm*—William C. Perry

[57] ABSTRACT

In the operation of gas turbine engines, it is an ever increasing goal to reduce the amount of harmful elements contained within the emissions of the engine. In particular, it is of primary importance to reduce the amounts of nitrogen oxides contained within the emissions. The use of a catalytic combustor is one known means by which the formation of nitrogen oxides may be controlled. However, the use of a catalytic combustor in a gas turbine engine has been known to be effective primarily in the upper ranges of engine operation. The present invention provides a combustor arrangement for a gas turbine engine that employs a first combustor means that utilizes a catalytic bed to react a mixture of fuel and air during an upper range of engine operation and a second combustor means that utilizes a plurality of premixed fuel injectors to ignite a mixture of fuel and air during a lower range of engine operation.

16 Claims, 4 Drawing Sheets

GAS TURBINE ENGINE CATALYTIC AND PRIMARY COMBUSTOR ARRANGEMENT HAVING SELECTIVE AIR FLOW CONTROL

TECHNICAL FIELD

This invention relates to a combustor arrangement for a gas turbine engine and more particularly to a combustor that employs a catalytic combustor and a lean premixed combustor to obtain ultra-low levels of nitrogen oxide emission levels.

BACKGROUND ART

The use of fossil fuel as the combustible fuel in gas turbine engines results in the production of a number of undesirable emissions. One particularly undesirable by-product is nitrogen oxide. Recently, governmental imposed regulations have severely restricted the allowable level of nitrogen oxide being emitted in the exhaust gases produced by the engines.

One combustion method that has proven to reduce nitrogen oxide emission levels is catalytic combustion. While this method is known to be effective, it is only effective over a limited overall fuel/air ratio range of the combustor. Levels of engine operation during part-load or during transient loading periods, have been known to experience much higher and environmentally unacceptable emission levels of nitrogen oxide. In some instances, the use of an assist burner has been used in conjunction with a catalyst bed to extend the overall fuel/air ratio range of the combustor. In order to assist the catalytic combustion process in this range of operation, the use of an assist burner downstream from the catalyst bed has been utilized to extend the overall fuel/air ratio range of the combustor. One such design is disclosed in U.S. Pat. No. 4,432,207, issued to Lewis B. Davis et al, on Feb. 21, 1984. It must be noted that while this design is intended to extend the overall fuel/air ratio range within the combustor by utilizing the assist burner downstream of the catalyst bed, it does not control the emission level of nitrogen oxide of the fuel burned by the auxiliary burner.

The present invention is directed to overcoming one or more of the problems set forth above.

DISCLOSURE OF THE INVENTION

In one aspect of the present invention a combustor arrangement for a gas turbine engine is provided. The combustor arrangement includes a catalytic combustor means having at least one catalyst bed that has a generally annular configuration and defines a centrally disposed opening therein. The catalyst bed is sufficient for reacting a mixture of fuel and air at a first preselected range of engine operation. A premixed combustor means is positioned within the centrally disposed opening defined by the catalyst bed and is sufficient for igniting a mixture of fuel and air at a second preselected range of engine operation.

In another aspect of the present invention, a gas turbine engine is provided with a compressor portion that is sufficient for providing a flow of compressed air and a turbine portion that is sufficient for driving engagement with an output shaft. A combustor arrangement is positioned between the compressor and the turbine portions to direct high energy gases into said turbine portion to provide drive thereto. The combustor arrangement includes a generally cylindrical housing member having first and second end portions. A generally cylindrical conduit member is provided that has a first and second end portion, the first end portion being engaged with the first end portion of the housing. The conduit has a diameter smaller than that of the housing and is positioned within the housing in radially inward spaced relationship thereto to form a first and second air passageways that are also positioned in substantially concentric relationship to one another. A catalytic combustor means is positioned within the first air passageway and a premixed combustor means is positioned within the second air passageway. A means for selectively controlling the flow of compressed air through one of the first and second air passageways is connected to the first end portion of the housing member.

BEST MODE FOR CARRYING OUT THE INVENTION

Referring to FIGS. 1–4, it can be seen that a gas turbine engine 10 is illustrated. The gas turbine engine 10 has an outer housing 12 having a central axis 14. Positioned in the housing 12 and centered about the axis 14 is a compressor portion 16, a turbine portion 18, and a combustor arrangement 20 that is operatively positioned between the compressor portion 16 and the turbine portion 18.

Figure 1:
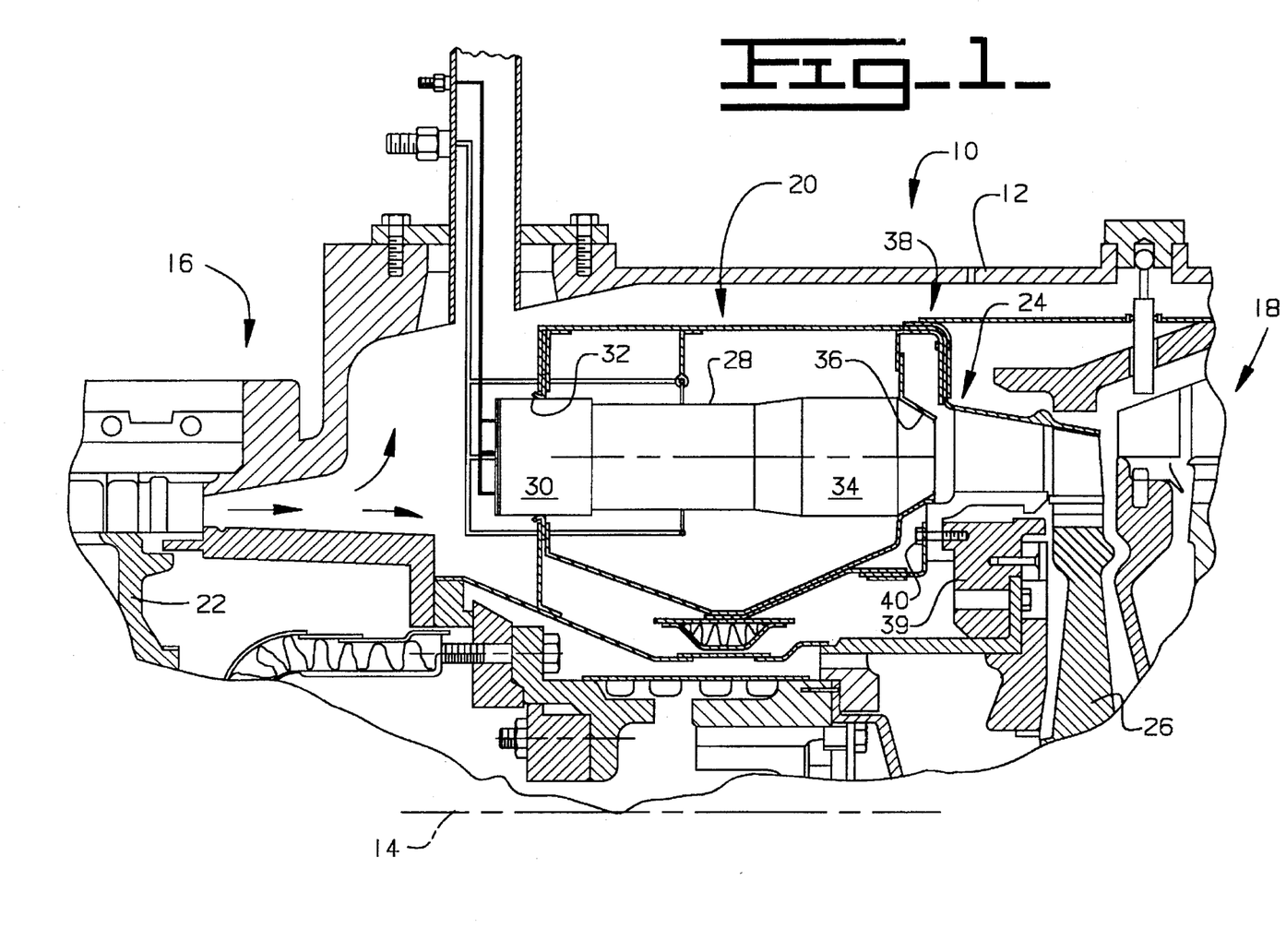
FIG. 1 is a diagrammatic side view of a gas turbine engine that embodies the principles of the present invention with portions of the view being shown in section for the convenience of illustration.

When the engine 10 is in operation, the compressor portion 16, which in this application includes an axial staged compressor 22 or, as an alternative, a radial compressor or any source for producing compressed air, causes a flow of compressed air which has at least a part thereof communicated to the combustor arrangement 20. The combustor arrangement, which will be described in greater detail hereinafter, produces expanded gases having a high level of energy which are directed to the turbine portion 18 of the engine 10. The energy of the expanding gases passes through a nozzle guide vane assembly 24 which is aerodynamically designed to direct the incoming gas from the combustor arrangement onto the blades of a turbine wheel 26 and thereby causing it to rotate. The turbine wheel is in turn, splined to a drive shaft (not shown) which is connected to an accessory component such as a generator to provide drive thereto.

Figure 2:
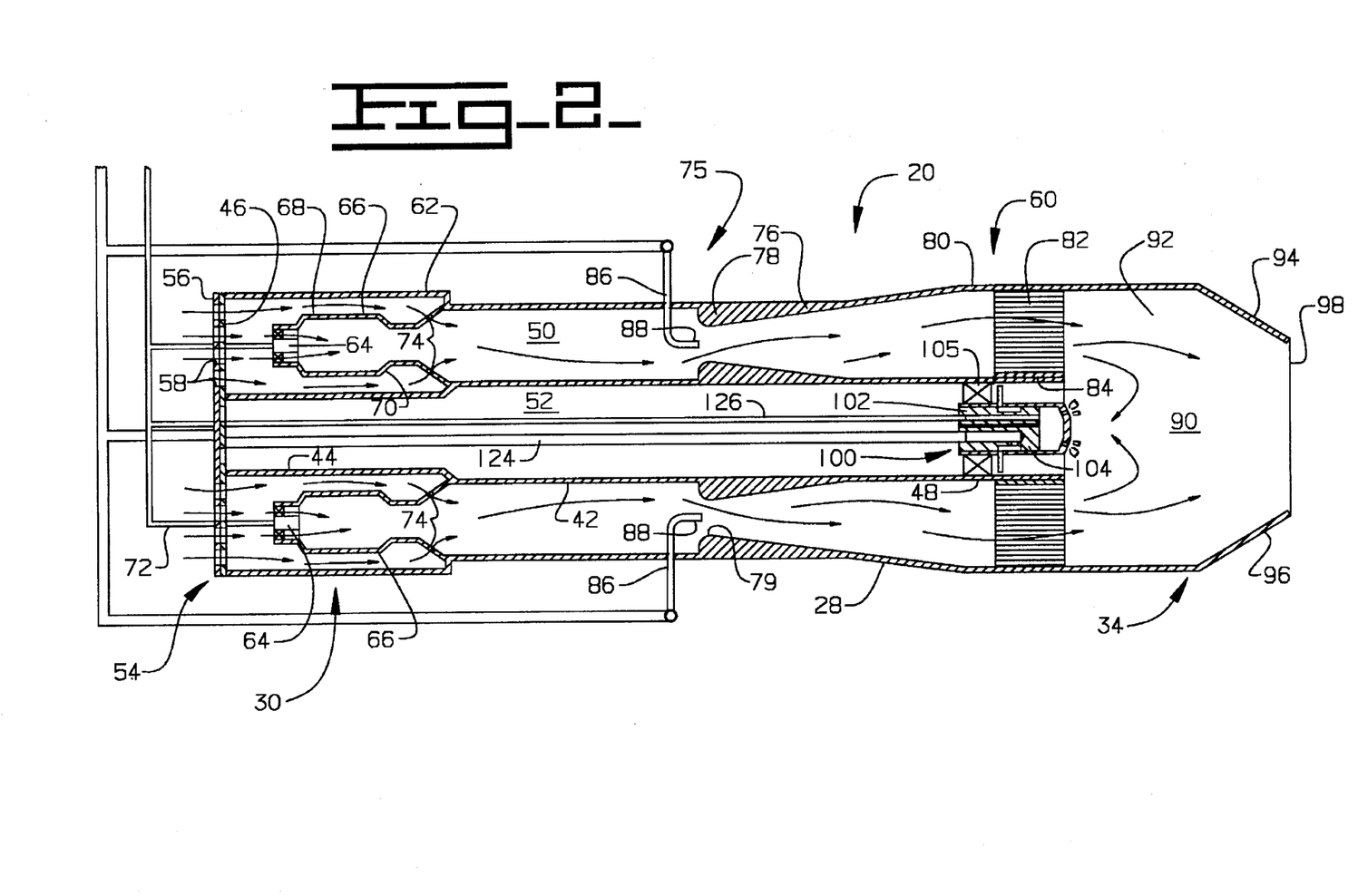
FIG. 2 is an enlarged side view of the combustor arrangement shown in FIG. 1 with portions thereof shown in section.
Figure 3:
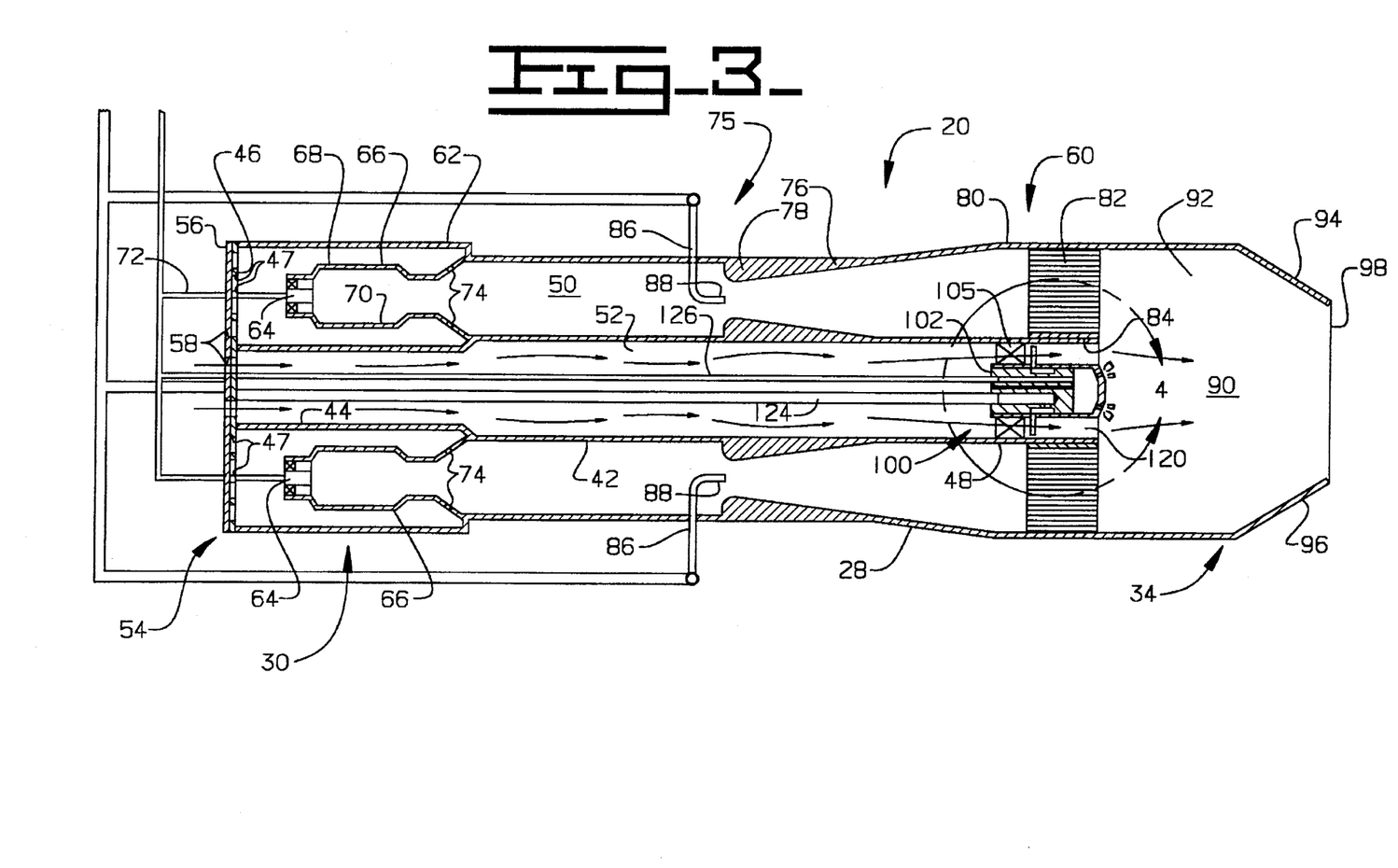
FIG. 3 is an enlarged side view of the combustor arrangement similar to that of FIG. 2 but illustrating another mode of operation.

The combustor arrangement 20 includes a generally cylindrical housing 28. The housing 28 has a first end portion 30 that is positioned within a first support collar 32 and a second end portion 34 that is positioned within a second support collar 36. The first and second support collars 32 and 36 form portions of a bracket assembly 38 that is in turn, attached to an inner support that forms a portion of the outer housing 12 of the engine by any suitable fastener such as bolts 40. While a single annular housing 28 is disclosed in the drawings, it is to be understood that a plurality of identical combustor housings are positioned radially about the central axis 14 and only one will be described in detail hereinafter.

A generally cylindrical or annular conduit 42 is positioned within the housing 28 and has a first end portion 44 that is engaged with a radially directed endwall 46 that is connected to the first end portion 30 of the housing and defines a plurality of openings 47 extending therethrough. The conduit 42 has a second end portion 48 that extends inwardly from the first end portion 44 to a position within the housing. The conduit has a diameter that is smaller than that of the housing and is positioned within the housing in substantially concentric relationship thereto. Being so positioned, the housing 28 is divided into a pair of internally directed air passageways 50 and 52 respectively. The first air passageway 50 is positioned between the conduit and the housing while the second air passageway 52 is formed by the conduit.

An air flow control means 54 is positioned in association with the radially directed endwall 46 to selectively direct the flow of air produced by the compressor portion 16 into one of the first or second air passageways 50 and 52. While any suitable control valve is acceptable, the illustrated embodiment discloses a plate member 56 having a plurality of holes 58 extending therethrough, that when rotated a preselected amount, will align with selected ones of the openings 47 formed in the endwall 46 to direct the air flow into one or the other of the air passageways. The respective conditions are illustrated in FIGS. 2 and 3.

Positioned within the first air passageway 50 is a first combustor means 60, which utilizes catalytic combustion as a means to produce the high energy gases needed to drive the turbine wheel 26. The catalytic combustor means includes a preheat chamber 62 that is positioned immediately adjacent and downstream from the air flow control means 54. The preheat chamber houses a plurality of lean burning, pilot premixed injectors 64. The pilot premixed injectors are located within a secondary conduit 66 that is made up of an outer wall 68 that extends inward from the housing 28 and an inner wall 70 that extends outward from the conduit 42. Communication with a source (not shown) of pilot fuel is provided to the pilot premixed injectors by a conduit 72. The secondary conduit 66 has a plurality of openings 74 defined in both the inner and outer walls 68 and 70 respectively, downstream from the pilot premixed injectors.

Immediately adjacent the secondary conduit 66, in the downstream direction, is a premixing chamber 75. At least a portion of the premixing chamber is comprised of a conically shaped duct or venturi 76. The duct 76 has a first end portion 78 that defines a necked down portion that define the opening 79 of reduced cross-sectional area. A second end portion 80 extends downstream from the first end portion 78 with a gradually increasing internal diameter which in turn, increases the cross-sectional area thereof to give the duct 76 a conical shape. Positioned within the second end portion of the duct 76 is a catalyst bed 82. The catalyst bed 82 is a generally cylindrical member that defines a centrally disposed opening 84 that is sufficient to receive the second end portion 48 of the annular conduit 42. The catalytic bed may be one of several well known designs and is preferably a monolithic or unitary structure comprising a carrier of high temperature relatively fragile ceramic material formed into a honeycomb-like structure that defines a multiplicity of thin-walled axially extending channels which allow the mixture of fuel and air to pass therethrough. The actual catalytically active material is either carried on the surface of the ceramic substrate, or impregnated therein, and may be a noble metal or a base metal oxide of such elements as zirconium, vanadium, chromium, manganese, copper, platinum, palladium, iridium, rhodium, ruthenium, cerium, cobalt, nickel, iron and the like.

A multi-point fuel injector 86 is supported by the housing and provides a plurality of injection points that are radially positioned about the housing 28. The fuel injector 86 defines a plurality of injection ports 88 that extends through housing 28 into the first air passageway 50. The injection ports 88 are located in the region of the air passageway 50 that is substantially coincident with the first end portion 78 of the conically shaped duct 76. The main fuel injectors supply a preselected amount of fuel into the air passageway and is mixed with the preheated compressed air in the air passageway 50 within the conical duct 76 prior to entering the catalytic bed 82.

After passing through the catalytic bed 82, the high energy, expanding gases that are created as a result of the catalytic reaction are passed into a combustion chamber 90 where the reaction is completed. The combustion chamber 90 is immediately adjacent the catalytic bed on the downstream side and has a first portion 92 of substantial volume to accommodate the completion of the combustor reaction. A pair of tapered walls 94 and 96 converge toward one another to form a second end portion 98 of the combustion chamber. The converging walls 94 and 96 are comprised of, or lined with, a material such as insulated ceramic, to provide an adiabatic wall that will limit heat loss. The second end portion 98 is necked down to a size that is substantially the same as that of the nozzle guide vane assembly 24 and is positioned immediately adjacent thereto. The converging walls direct the high energy gases into the nozzle guide vane assembly 24 to produce the necessary driving rotation of the turbine portion 18 of the engine 10 as previously discussed.

Figure 4:
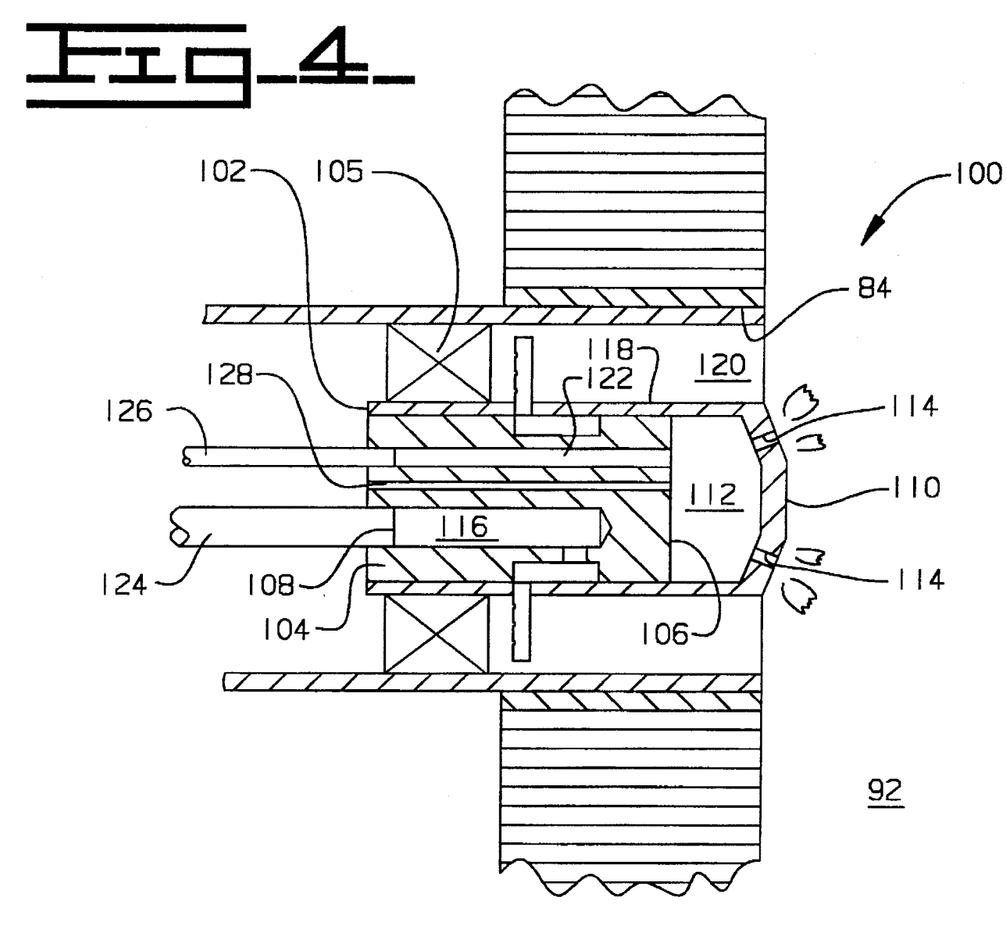
FIG. 4 is an enlarged side view of the area indicated at 4 in FIG. 1 that illustrates in greater detail portions of combustor arrangement.

A second means of combustion 100, which is best illustrated in FIG. 4, is provided in the form of a premixed combustor 100 that is positioned within the second air passageway 52. The premixed combustor utilizes a premixed fuel injector 102 that is positioned in the region of the centrally disposed opening 84 of the catalyst bed 82. The premixed fuel injector defines a generally cylindrical body portion 104. The positioning of the fuel injector 102 within the conduit 42 is such that the cylindrical body portion 104 thereof is maintained in spaced and substantially concentric relationship to the conduit by a swirler member 105. A first end portion 106 of the fuel injector is positioned for communication with the first portion 92 of the combustion chamber 90. A second end portion 108 of the fuel injector is positioned within the opening 84 defined by the catalyst bed 82. As can best be seen in FIG. 4, a closure member 110 is positioned in coextensive relationship with the cylindrical body portion 104 and is spaced from the first end portion 106 of the fuel injector 102 to form a reservoir 112. A plurality of angularly directed openings 114 are formed in the closure member 110 that communicate the reservoir with the first portion 92 of the combustion chamber 90. A first fuel passageway 116 is defined by the body portion 104 of the fuel injector and extends between the second end portion 108 of the fuel injector and an outer circumferential surface 118 to communicate with a space 120 that exists between the annular conduit 42 and the outer surface 118. A second fuel passageway 122 is defined by the body portion 104 and extends between the second end portion 108 of the fuel injector and the reservoir 112. A pair of conduits 124 and 126 are connected to the first and second fuel passageways 116 and 122 respectively and extend the length of the annular conduit 42 and exit through the endwall 46 and the plate member 56 of the air flow control means 54. The conduits 124 and 126 respectively communicate the fuel passageways 116 and 122 with respective sources of main and pilot fuel. An air passageway 128 extends between the end portions of the injector to communicate a small flow of compressed air to the reservoir 112. It is to be understood that the premixed fuel injectors 102 are of the type whereby a controlled, lean mixture of fuel and air is passed therethrough. This type of injector is of a commonly known type of injector that is marketed under the SoLoNOx trademark and its operation is widely known for effectively controlling the formation of nitrogen oxides, carbon monoxides and unburned hydrocarbons.

Industrial Applicability

In operation, the gas turbine engine 10 is started and allowed to warm up and is used in any suitable power application. When operating in a capacity that is considered a "part load" or "transient" capacity which is less that 50% of it's normal operating load, the engine will employ the second or premixed combustion means 100. In this capacity, which is illustrated in FIGS. 3 and 4, the air flow control means 54 is positioned to allow compressed air into the second air passageway 52, defined by conduit 42, through holes 58 in plate member 56. The compressed air will flow through the conduit 42 and will substantially maintain the temperature at which it was discharged from the compressor portion 16. The air will pass through the swirler member 105 which stimulates the mixing of the air with the injection of main fuel through first fuel passageway 116 in space 120. The controlled mixture of air and fuel will be caused to ignite in accordance with the known operation of the lean premixed fuel injectors 102, maintaining extremely low nitrogen oxide levels in the expanding gases that result from the ignition. As the now igniting mixture flows into the combustion chamber 90, the combustion reactions are completed achieving temperatures of up to 1644 degrees K. (2500 degrees F.). Since the walls 94 and 96 of the combustion chamber are normally made of an insulated ceramic or other material that will constitute an adiabatic wall, combustion reactions and improved stability of the gases is achieved. The gases are subsequently directed into the nozzle guide vane assembly 24 utilizing their energy to drive the turbine portion 18.

As the engine load increases to a level that exceeds approximately 50 percent of engine capacity, the airflow control means 54 will cause the airflow to be changed to flow through the first air passageway 50. There, the compressed air is directed into the preheat chamber 62 through the premixed pilot injectors 64 and the temperature is increased by the burning of the pilot premixed injectors 64 to a temperature of approximately 1750 degrees K. (2700 degrees F.). The pilot injectors are of the lean premixed configuration that are designed to operate at conditions to suppress nitrogen oxide emissions. Compressed air is introduced into the first air passageway downstream from the pilot injectors through openings 74 to combine with the preheated air passing through the pilot injectors. This air is mixed within the premixing chamber 75 whereupon it is further mixed with a source of main fuel through injectors 86. Since the injection of main fuel occurs at the opening of the conical duct 76, the venturi effect created thereby is utilized to thoroughly mix the air and fuel and to lower the inlet face velocity of the air flow prior to entering the catalyst bed 82. At this point gas temperatures will fall to a temperature that is within a range of 644 to 750 degrees K. (700 to 900 degrees F.). Reaction of the air and fuel mixture is initiated as the mixture passes through the catalyst bed 82 and the temperatures are elevated typically to a range of 1250 to 1367 degrees K. (1800 to 2000 degrees F.). As the reacted mixture passes into the combustion chamber 90 the reaction process is completed and the gas temperatures are elevated to temperatures of approximately 1644 degrees K. (2500 degrees F.). The mixture is subsequently diluted with air to bring the temperature of the mixture to approximately 1430 degrees K. (2120 F.). At this point the mixture is sufficient for entry into the turbine inlet and the mixture is thereby directed into the nozzle guide vane assembly 24 as previously described.

When operating in the catalytic combustion mode, the configuration of the premixed fuel injectors 102 and their central positioning within the opening 84 of the catalyst bed creates a recirculation zone or "bluff body" that enhances the recirculation of the gases in the combustion chamber 90 in the region of the fuel injectors. The burning of the recirculated gases is enhanced by a pilot flame (FIGS. 2 and 4) that is provided through the closure member 110 of the fuel injector 102. The pilot flame is created by the introduction of pilot fuel into the reservoir 112. When the level of engine load dictates that the means of combustion be changed from premixed combustion to catalytic combustion, fuel is introduced to the fuel injectors 102 through pilot conduit 126 and the second fuel passageway 122. The fuel is communicated to the combustion chamber 90 through the openings 114 in the closure member 110 whereupon it is ignited. This not only assists the burning of the recirculated gases, but also prevents the occurrence of engine flameout.

With a combustor arrangement as set forth above, it can be seen that the formation of nitrogen oxides can be controlled in all ranges of engine operation, thus maintaining extremely low levels of nitrogen oxide emission.

Other aspects, objects and advantages of this invention can be obtained from a study of the drawings, disclosure and the appended claims.

We claim:

1. A combustor arrangement positioned within a flow of compressed air that is directed between a compressor and a turbine portion of a gas turbine engine, comprising:

a housing having a first and second end portion and a first and second air passageway positioned between the end portions;

a catalytic combustor means having at least one catalyst bed having a generally cylindrical configuration with a centrally disposed opening defined therein, said catalyst bed being positioned within the first air passageway and being sufficient for reacting a mixture of fuel and air at a first preselected range of engine operation;

a premixed combustor means positioned within the second air passageway and being sufficient for igniting a mixture of fuel and air at a second preselected range of engine operation; and means for controlling air flow to the combustor arrangement, said air flow controlling means being mounted to the first end portion of the housing and being selectively operable between a first condition wherein the air flow is directed through the first air passageway and a second condition wherein air flow is directed through the second air passageway.

2. The combustor arrangement as set forth in claim 1 wherein the catalytic combustor means further includes a premix combustor having a pilot premixed injector positioned in the air flow between the air flow controlling means and the catalytic bed to provide a pre-heated mixture of fuel and air for introduction into the catalyst bed.

3. The combustor arrangement as set forth in claim 2 wherein the catalytic combustor means includes a main fuel injector having a plurality of injection points radially positioned within the air flow downstream of said pilot injector to provide the introduction of a main source of fuel into the mixture of pre-heated fuel and air.

4. The combustor arrangement as set forth in claim 3 wherein a premixing chamber is positioned between said main fuel injector and the catalyst bed, said premixing chamber being sufficient to provide mixing of the main fuel with the pre-heated mixture before introduction into the catalyst bed.

5. The combustor arrangement as set forth in claim 4 wherein the premixing chamber further defines a conically shaped duct having a first end portion that defines an opening having a cross-sectional area that is reduced with respect to that of the premixing chamber upstream from the duct and being positioned immediately adjacent the main fuel injector, and a second end portion having a cross-sectional area larger than that of said first end portion and being positioned immediately adjacent the catalyst bed.

6. The combustor arrangement as set forth in claim 1 wherein a combustion chamber is positioned downstream of the catalytic and pre-mixed combustors in immediately adjacent relationship thereto, said combustion chamber providing a first portion wherein combustion reaction is completed and a second portion that directs the combusted gases to a turbine portion of the engine.

7. The combustor arrangement as set forth in claim 6 wherein the premixed combustor means includes a premixed fuel injector that is sufficient for igniting a controlled, lean mixture of fuel and air that is passed therethrough to thereby control the formation of nitrogen oxide, carbon monoxide and unburned hydrocarbons during the second range of engine operation.

8. The combustor arrangement as set forth in claim 7 wherein the premixed fuel injector is positioned within a conduit having a first end portion connected to the air flow controlling means and a second end portion connected to the centrally disposed opening defined by the catalyst bed, said premixed fuel injector being maintained in substantially concentric relationship to the annular conduit.

9. The combustor arrangement as set forth in claim 8 wherein the premixed fuel injector further includes:
  a generally cylindrical body portion having an outer circumferential surface and first and second end portions;
  a closure member having a plurality of openings formed therethrough, said closure member being connected to the first end portion of the cylindrical body portion in a manner to form a reservoir between the first end portion of the cylindrical body portion and the closure member, said openings defined by the closure member being positioned for communication between the reservoir and the combustion chamber;
  a first fuel passageway extending between the second end portion and the outer circumferential surface defined by the cylindrical body portion, said first fuel passageway being in communication with the space between the premixed fuel injector and the annular conduit; and
  a second fuel passageway extending axially between said first and second end portions, said second fuel passageway being in communication with said reservoir.

10. A gas turbine engine having a compressor portion that is sufficient for providing a flow of compressed air and a turbine portion that is sufficient for driving engagement with an output shaft, and a combustor arrangement positioned between the compressor and turbine portions to direct high energy gases into said turbine portion to provide drive thereto, said combustor arrangement comprising:
  a generally annular housing member having first and second end portions;
  an annular conduit member having a first end portion engaged with the first end portion of the housing and a second end portion, said annular conduit having a diameter smaller than that of the annular housing and being positioned therewithin in radially inwardly spaced relationship thereto to form a first and second air passageways, that are positioned in substantially concentric relationship to one another;
  a catalytic combustor means positioned within the first air passageway;
  a premixed combustor means positioned within the second air passageway; and
  means for selectively controlling the flow of compressed air through one of the first and second air passageways, said air flow controlling means being connected to the first end portion of the housing member.

11. The combustor arrangement as set forth in claim 10 wherein the first air passageway further includes:
  a preheat combustor having a plurality of pilot premixed injectors positioned adjacent the control valve to preheat the compressed air as it enters the first passageway;
  a premixing chamber having a conically shaped duct defined therein, said duct having a first end portion that defines an opening of reduced cross-sectional area with respect to that of the premixing chamber positioned upstream from said opening and a second end portion having a cross-sectional area larger than that of said first end portion to define a conically shaped, venturi-type duct;
  a main fuel injector having a plurality of injection points positioned radially about the housing and extending into the first air passageway at a location that is generally coincident with the first end portion of the conically shaped duct to introduce main fuel into said first passageway for mixing with the preheated compressed air within said duct;
  a catalyst bed having a generally cylindrical configuration and a generally centrally disposed opening formed therein that is connected to the second end portion of the conduit, said catalyst bed being positioned adjacent the second end portion of the conical duct and being constructed of a material that is sufficient for reacting the mixture of fuel and air that is introduced from the premixing chamber at a temperature that controls the formation of nitrous oxides.

12. The combustor arrangement as set forth in claim 11 wherein the premixed combustor means includes a premixed fuel injector that is sufficient for igniting a controlled, lean mixture of fuel and air that is passed through the second air passageway to thereby control the formation of nitrogen oxides, said fuel injector being positioned within the centrally disposed opening defined by the catalyst bed.

13. The combustor arrangement as set forth in claim 12 wherein a combustion chamber is positioned downstream of the catalytic bed and the premixed fuel injector in immediately adjacent relationship thereto, said combustion chamber being sufficient for providing a chamber wherein combustion reaction is completed and high energy gases that result therefrom are directed to the turbine portion.

14. The combustor arrangement as set forth in claim 10 wherein the second air passageway includes a premixed fuel injector positioned within the conduit in spaced parallel relationship thereto.

15. The combustor arrangement as set forth in claim 10 wherein a plurality of housings are radially spaced about a centerline of the drive shaft.

16. The combustor arrangement as set forth in claim 10 wherein the air flow control means includes an end plate having a plurality of holes formed therethrough, said end plate being rotatable from a first position wherein the holes communicate flow of compressed air into the first air passageway and block the flow of air to the second air passageway and a second position wherein the holes are placed in communication with the second air passageway and block the flow of air to the first air passageway.

* * * * *

UNITED STATES PATENT AND TRADEMARK OFFICE
CERTIFICATE OF CORRECTION

PATENT NO. : 5,452,574

DATED : September 26, 1995

INVENTOR(S) : Luke H. Cowell and Peter B. Roberts

It is certified that error appears in the above-identified patent and that said Letters Patent is hereby corrected as shown below:

ON THE TITLE PAGE:

Please correct the title to read --GAS TURBINE ENGINE CATALYTIC AND PREMIX COMBUSTOR ARRANGEMENT HAVING SELECTIVE AIR FLOW CONTROL--.

Signed and Sealed this

Eleventh Day of June, 1996

Attest:

BRUCE LEHMAN

Attesting Officer     Commissioner of Patents and Trademarks